SYNCHRONIZING DEVICE FOR A HIGH SPEED SHEET STACKING SYSTEM

Filed June 5, 1968 2 Sheets-Sheet 1

INVENTORS
RALPH H. SCHULTZ
VINCE G. DEMPSEY

INVENTORS
RALPH H. SCHULTZ
VINCE G. DEMPSEY

United States Patent Office 3,512,771
Patented May 19, 1970

3,512,771

SYNCHRONIZING DEVICE FOR A HIGH SPEED SHEET STACKING SYSTEM

Vince G. Dempsey, Framingham, Mass., and Ralph H. Schultz, Norristown, Pa., assignors to Sperry Rand Corporation, New York, N.Y., a corporation of Delaware Filed June 5, 1968, Ser. No. 734,711
Int. Cl. B65h 5/26, 29/34
U.S. Cl. 271—3 7 Claims

ABSTRACT OF THE DISCLOSURE

A document handler is provided wherein documents fed from a supply hopper to a continuously rotating disc stacker are routed through either a first transport path or a second transport path in dependence upon the angular position of the disc stacker at the time the document arrives at a predetermined point in the document transport system.

This invention relates to a document handler system and, in more particular, to a simple and reliable means for permitting the stacking mechanism shown in U.S. Pat. 3,162,438 issued Dec. 22, 1964, to be used with an asynchronously operated feed mechanism. The use of the stacker mechanism shown and described in the above patent has been well received and its incorporation in document handling systems offers numerous advantages in high speed document handling. For example, it permits documents of varying sizes and thicknesses moved at high speeds by the document transport system to be gently stacked without damage or mutilation to the documents.

As normally used, the stacking disc moves continuously and a fully synchronized document feed is provided. In such an arrangement documents are fed synchronously with the rotation of the stacking disc and this permits the documents to arrive at the disc at the proper time to be received by the slots in the stacker disc. In those document handling systems where a document is to be fed from a supply bin or hopper upon command or upon receipt of a document feed signal which may be randomly issued relative to the movement of the disc, some means of timing the arrival of the document at the stacker disc must be provided. It is accordingly the purpose of this invention to provide such a means.

BRIEF SUMMARY OF THE INVENTION

In accordance with the teachings of this invention, the disc stacker mechanism of the aforementioned patent is combined with an asynchronous document feed mechanism in such a manner as to permit documents to be fed from a supply source upon command and independently of the angular position of the stacking disc. To this end the transport mechanism which transports the documents from the feed device to the stacker includes a pair of transport paths one of which has a first transit time and the other of which has a second transit time different from the first. Ahead of the two transport paths and at a predetermined point in the document transport system is a leading edge of document presence detector which detects the presence of a document at the predetermined point. A signal generator is coupled to the stacker disc and produces a signal which indicates the angle of the stacker disc. A comparator circuit compares the signal generated by the document detector circuit with the output signal from the stacker signal generator. A document deflector gate is controlled by the output of the comparator and deflects the document into one transport path or the other in dependence upon the angular position of the stacker disc at the time the document arrives at the predetermined point in the transport path.

Figure 1:
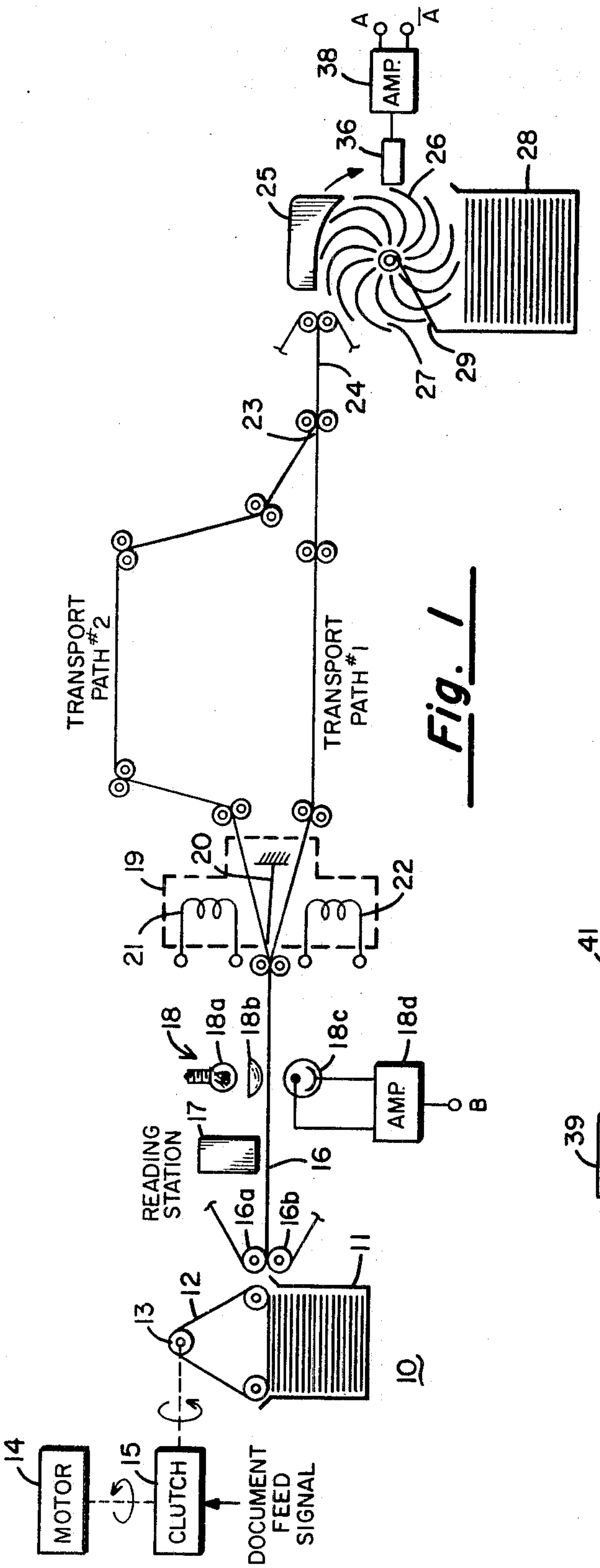
FIG. 1 is a diagrammatic illustration of one typical embodiment of the present invention.

Referring now in particular to FIG. 1 there is shown at 10 a document feed mechanism which may typically include a supply bin 11 for holding documents and a friction belt 12 for feeding documents one at a time from the bin 11. Feed mechanisms of this general type are well known in the art and may include a drive roller 13 around which the friction belt 12 is looped; a drive motor 14, and an electro-magnetic clutch mechanism 15 for coupling the motor 14 to the drive roller 13. In operation, a document feed signal of a predetermined duration is applied to the clutch 15 to permit a momentary coupling of the motor 14 to the drive roller 13 and to thereby feed a document from the bin 11 into a moving belt type of document transport system 16. The belt transport 16 is also generally well known in the art and may include a pair of belt members which are continuously driven in the same direction by a pair of drive rollers **16*a* and 16*b* located near the throat of the feed mechanism. The belts comprising the transport 16 are normally held in face-to-face contacting relationship and are arranged relative to the feed mechanism 10 so that a document being fed from mechanism 10 is gripped by the belts and pulled along therewith. As the document is moved along its transport path by the belts 16, it first passes a utilization station, such as a reading station 17, where the information carried by the document is sensed. Thereafter the document is moved past a leading edge detector 18 which detects the presence of the document at a prdetermined point in the transport path. The leading edge detector 18 may typically include a light source 18*a*, a lens 18*b*, a photocell 18*c* and a single ended amplifier 18*d*. In operation, as the leading edge of the document passes the leading edge detector 18, the light from source 18*a* that normally impinges upon photocell 18*c* is interrupted and amplifier 18*d* generates at its output terminal B a momentary impulse such as shown by waveform B in FIG. 5. After passing the leading edge detector, the document deflector gate shown at 19. The deflector gate 19 which may be also of standard design includes a deflector blade 20 and a pair of solenoid coils 21 and 22 for operating the deflector blade 20. In this regard energization of the solenoid 21 deflects the blade upwardly as shown in FIG. 1 to thereby deflect the document downwardly into the relatively short transport path labelled "transport path #1." If, however, solenoid 22 is energized then the blade 20 is moved downwardly to deflect the document into the upper relatively long transport path labelled "transport path #2." The transport paths #1 and #2 merge at point 23 to form a common output path 24 which leads to the stacker 26. The document in leaving the path 24 is caused to pass between a guide block 25 and the stacker disc 26 where it is picked up by one of the spiral slots 27 formed in the stacker disc 26. The stacker disc 26 is rotated continuously in a clockwise direction and carries the document to a stripping knife 29 which removes the document from the slot 27 and gently deposits it in the stacker bin 28**.

Figure 2:
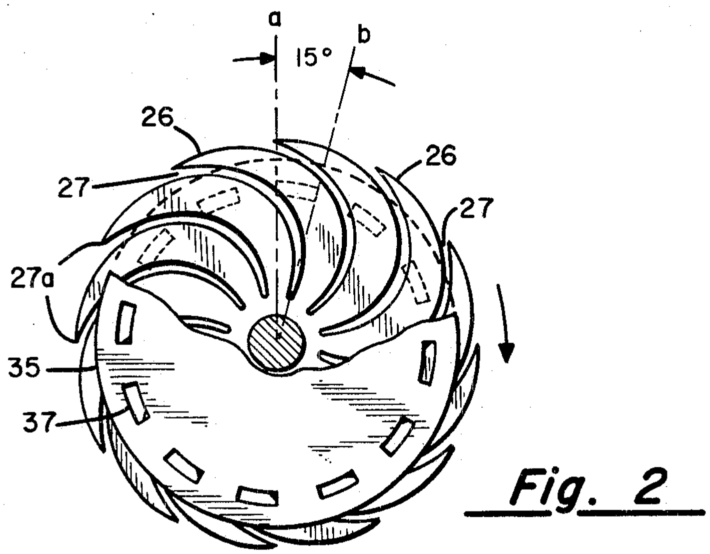
FIG. 2 shows in partial broken-away view the stacker disc assembly shown in FIG. 1.
Figure 3:
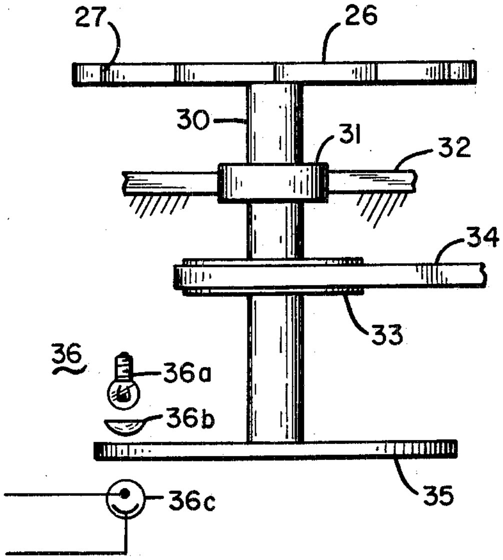
FIG. 3 shows a side elevational view of the stacker disc assembly shown in FIG. 1.

The stacker disc assembly which is shown in more detail in FIGS. 2 and 3 and to which reference is now made, includes as a typical example twelve spiral-shaped slots 27 (one every 30°) which extend inwardly from the periphery of the disc 26 toward the hub. These slots are designed as set forth in the forementioned patent and are arranged so that the document acceptance angle, that is the position of the slots at the time the document arrives at the guide block 25, can vary by as much as 15° and still permit the document to be accepted by one of the slots. In more particular, the tips 27a of the blades of the disc 26 can lie any place between reference positions *a* and *b* (FIG. 2) and still permit document acceptance. The stacker disc 26 also includes a shaft 30 which is journaled at 31 into the bed or base plate 32 of the equipment. The shaft 30 has mounted thereon a drive pulley 33 which is driven by a belt mechanism 34 which, although not shown, also drives the drive pulleys 16a and 16b of the belt transport 16. In this manner, the transport speed of the transport 16 is held in a fixed relationship to the rotational rate of the disc stacker 26. In a typical embodiment a four-to-one speed ratio was chosen. That is, the belt transport 16 was driven with a linear velocity of 150 inches per second while the peripheral velocity of the stacking disc 26 was moved at 37½ inches per second.

Fixed to the shaft 30 and rotated therewith is a slotted disc 35 in which has been formed a series of 12 apertures on slots 37 each of 15° in length and spaced 15° apart. The disc 35 and its slots 37 form in part an angle detector circuit 36 for the stacker disc 26. The angle detector circuit 36 further includes a light source 36a, a focusing lens 36b located on one side of the disc 35 and a photocell 36c located on the opposite side of the disc 35. In operation, the light from source 36a shines down on the disc 35 and when one of the slots 37 passes under the light source 36a the photocell 36c will respond and produce a relatively positive output signal having a duration depending upon the slot length and a spacing depending upon the spacing between slots. This signal which is generated by the photocell 36c is applied as indicted in FIG. 1 to an amplifier 38 of the so-called push-pull class which will generate square waves in a push-pull manner on its output terminals A and $\bar{A}$. As shown by the corresponding waveforms in FIG. 5, the signals A and $\bar{A}$ have a 50% duty cycle wherein, for example, when a slot 37 is in registration with the light source 36a, signal A is at a relatively positive level and signal $\bar{A}$ is at a relatively negative level. During the next 15° of disc 35 movement, where the light from source 36a is blocked from photocell 36c, the signal levels A and $\bar{A}$ are reversed wherein signal $\bar{A}$ is at a relatively positive level and signal A is at relatively negative level.

Figure 4:
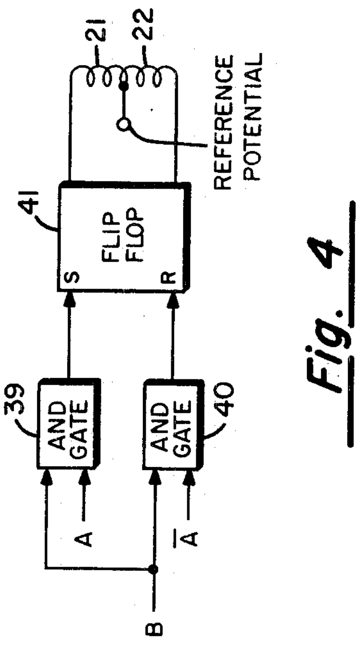
FIG. 4 shows in simplified block diagram form the comparator circuit utilized by the present invention.

The comparator circuit for controlling the action of the document deflector gate 19 is shown in FIG. 4 to which reference is now made. As illustrated in this figure the comparator may typically include a pair of two input AND gates 39 and 40 and a flip-flop 41. The leading edge detector signal B, as illustrated in this figure, is applied in parallel to each of the two input AND gates 39 and 40. The other input for each of these AND gates is derived from the push-pull amplifier 38 of the angle detector circuit 36. In more particular, the A output of amplifier 38 is coupled to AND gate 39 whereas the $\bar{A}$ output of amplifier 38 is coupled to AND gate 40. In operation, gate 39 is rendered operative when the A signal is at its relatively positive level and is rendered inoperative during the relatively negative portions of the A signal. Similarly, gate 40 is rendered operative during the time that the $\bar{A}$ signal is relatively positive and inoperative during the time that the $\bar{A}$ signal is relatively negative. The outputs from AND gates 39 and 40 are applied to the set and reset terminals, respectively, of the flip-flop 41 the output of which is utilized to energize the solenoids 21 and 22 of the document deflector gate 19. In operation, if a leading edge signal B is produced during the time that light passes through one of the timing slots 37 in the timing disc 35 and therefore during the presence of a relatively positive A signal, the flip-flop 41 is set by the passage of a leading edge signal B through gate 39. When the flip-flop 41 has been set, the solenoid 21 is energized and documents are deflected into the transport path #1. In the alternative if the leading edge signal B is produced during the generation of a relatively positive $\bar{A}$ signal which occurs when the light 36a is blocked from photocell 36c then the gate 40 is activated and the flip-flop 41 is reset. In the reset condition solenoid 22 is energized and the deflector blade 20 is deflected downwardly and the document is caused to pass through the transport path #2.

Thus, from the foregoing description it will be recognized that if a document arrives at the leading edge detector 18 at the time light from source 36a impinges on photocell 36c, the document is deflected through the relatively short transport path #1 to the stacker 26. If, however, the document arrives at leading edge detector 18 at the time light from source 36a is blocked from photocell 36c the document will be deflected through the relatively long transport path #2 to the stacker 26. It will also be apparent from the foregoing description, that the difference in the path lengths between transport paths #1 and #2 should correspond to 15° of angular movement of the stacker dics 16.

To illustrate this point in more detail, assume for example, that the path length from detector 18 to the stacker disc 26 when the document follows path #1 is arbitrarily set at 47 inches. Further assume that the distance between the successive tips 27a of the stacker blades equals 3 inches and as previously set forth that the speed ratio between document movement of the main transport 16 to the peripheral movement of the disc 26 is four-to-one. Then with the assumed parameters, 15° of disc 26 movement corresponds to 1½ inches of movement at the periphery of the disc 26 and therefore 6 inches of movement in the transport system 16. Thus, transport path #2 should differ in length from transport path #1 by 6 inches which in this case would be 6 inches longer. Thus, in the cited example, the length of the path from the leading edge detector 18 to the stacker 26 when following transport path #2 would be 53 inches.

The length of the path from the leading edge detector 18 to the stacker 26 is also determinative of the angular relationship of the slots 37 to the stacker blade tips 27a. For example, if the transport path length following path #1 corresponds to an integral number of 30° movements of the disc 26 then the slots 35 can be aligned with the stacker blade tips 27a as shown in FIG. 2. For example, if the aforementioned path length had been assumed to be 48 inches instead of 47 inches the disc 26 would have moved through 12 inches during the time that the document moved from leading edge detector 18 to the stacker 26. This would correspond to exactly four stacker blade positions or 120° of disc 26 movement. In the assumed example, however, the disc movement corresponds to 11¾ inches or 117½° of disc 26 movement. Accordingly, since the angle 117½° is 2½° off from being an integral multiple of 30° the slots 37 should be displaced 2½° from their illustrated position.

Figure 5:
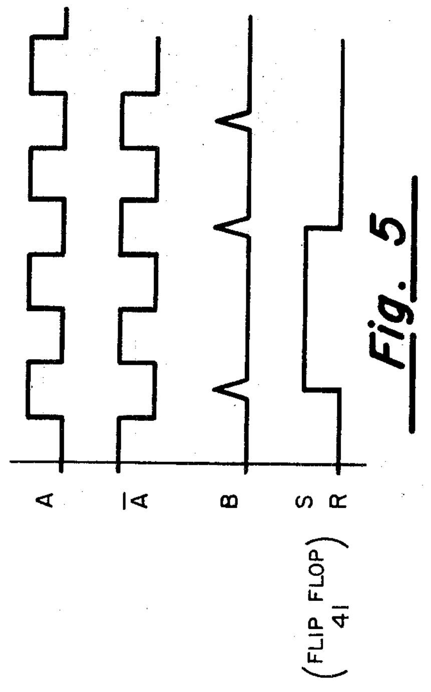
FIG. 5 shows a series of waveforms useful in explaining the operation of the present invention.

FIG. 5 shows a typical operation of the mechanism as applied to three successive documents. As shown by the first pulse in waveform B, the document arrives during the existence of the A signal from amplifier 38. This causes the flip-flop 41 to set and to energize solenoid 21 thereby causing the document to move through transport path #1. The second document, however, arrives at the time that gate 40 is made operative by the $\bar{A}$ signal and the flip-flop 41 is reset to energize solenoid 22. This moves the deflector blade 20 downwardly and causes the document to follow transport path #2. The third document also arrives during the time gate 40 is made operative by the $\overline{A}$ signal. Since, however, the flip-flop 41 has already been reset no change occurs in the position of the deflector blade 20 and the third document is also routed through the transport path #2 to the stacker 26.

Although we have shown and described only a certain and specific embodiment of our invention it will be understood that there are many modifications possible thereof without departing from the spirit of the teachings of the invention.

What is claimed is:

1. A document handler system which includes a rotating stacker disc having a plurality of document carrying slots arranged around it periphery; said handler system including a document transport mechanism which comprises, a first document transport path having a first transport time, a second document transport path having a second transport time, a document deflector gate operable to deflect documents to one or the other of said transport paths, and means for controlling the actuation of said deflector gate in accordance with the angular position of said stacker disc when the documents arrive at a predetermined point in the transport path leading up to said first and second transport paths.

2. A system as set forth in claim 1 wherein one of said first or second transport paths is longer than the other.

3. A system as set forth in claim 1 wherein the last-named means includes a first means for indicating the presence of a document at said predetermined point and a second means for sensing the angular position of said stacker disc in response to the operation of said means for indicating the presence of a document at said predetermined point.

4. A system as set forth in claim 3 wherein said second means includes a comparator circuit for controlling the actuation of said document deflector gate in response to the joint action of said first and second means.

5. A system as set forth in claim 1 wherein there is further included a document hopper, and a document feed device for feeding documents from said hopper into said transport mechanism upon demand.

6. A system as set forth in claim 3 wherein the first means comprises a leading edge detector for generating a leading edge signal in response to the leading edge of a document at said pedetermined point and said second means comprises a signal generator coupled to said disc stacker operative to generate a repetitive signal of one level for a set of first angular positions of said disc and a repetitive signal of a second level for a set of second angular positions of said disc intermediate the first angular positions and which further includes a comparator circuit for comparing the leading edge signal with the signal level generated by said second means, and means for operating said deflector gate in response to the ouptut of said comparator circuit.

7. A system as set forth in claim 1 wherein the difference in transport times of said first and second transport paths is related to the rotational rate of said disc stacker.

References Cited

UNITED STATES PATENTS

| | | | |
|---|---|---|---|
| 3,162,438 | 12/1964 | Perry | 271—71 |
| 3,206,191 | 9/1965 | Hantscho | 271—64 |
| 3,416,863 | 12/1968 | Ralston | 271—64 |

RICHARD E. AEGERTER, Primary Examiner

U.S. Cl. X.R.

271—71